United States Patent
Sorrentino et al.

(10) Patent No.: US 11,135,982 B2
(45) Date of Patent: Oct. 5, 2021

(54) INTERIOR TRIM OF A MOTOR VEHICLE

(71) Applicant: Dr. Ing. h.c. F. Porsche Aktiengesellschaft, Stuttgart (DE)

(72) Inventors: Alessandra Sorrentino, Pforzheim (DE); Stefan Schmitz, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 164 days.

(21) Appl. No.: 16/559,529

(22) Filed: Sep. 3, 2019

(65) Prior Publication Data
US 2020/0070740 A1    Mar. 5, 2020

(30) Foreign Application Priority Data
Sep. 4, 2018   (DE) .................. 10 2018 121 472.3

(51) Int. Cl.
  *B60R 13/02*   (2006.01)
(52) U.S. Cl.
  CPC ........ *B60R 13/0243* (2013.01); *B60R 13/025* (2013.01); *B60R 2013/0293* (2013.01)
(58) Field of Classification Search
  CPC .............. B60R 13/0243; B60R 13/025; B60R 2013/0293
  See application file for complete search history.

(56) References Cited

U.S. PATENT DOCUMENTS

| 2012/0110918 A1 | 5/2012 | Love |
| 2012/0216965 A1 | 8/2012 | Castagnola et al. |
| 2013/0057009 A1 | 3/2013 | Turicik et al. |

FOREIGN PATENT DOCUMENTS

| DE | 10 2008 039 122 | 4/2010 |
| DE | 10 2008 052 966 | 4/2010 |
| DE | 10 2010 005 309 | 8/2010 |
| DE | 20 2012 101 389 | 9/2013 |
| DE | 10 2014 110 023 | 1/2016 |
| DE | 10 2015 114 230 | 3/2017 |
| DE | 10 2017 000 601 | 8/2017 |
| EP | 0 648 944 | 11/1997 |
| FR | 2 719 271 | 11/1995 |
| FR | 2 886 691 | 12/2006 |
| JP | 7-158621 | 6/1995 |
| WO | 02/06071 | 1/2002 |
| WO | 2017-103366 | 6/2017 |

OTHER PUBLICATIONS

British Office Action dated Jan. 12, 2021.
German Search Report dated May 29, 2019.
Great Britain Combined Search and Examination Report dated Feb. 14, 2020.

*Primary Examiner* — D Glenn Dayoan
*Assistant Examiner* — Melissa Ann Bonifazi
(74) *Attorney, Agent, or Firm* — Gerald E. Hespos; Michael J. Porco; Matthew T. Hespos

(57) ABSTRACT

An interior trim covers sections of door cutouts (1a, 1b) of a motor vehicle body facing a floor. The interior trim has a first trim panel (2a) for covering a section (3a) of the first door cutout (1a) facing the vehicle floor, a second trim panel (2b) for covering a section (3b) of the second door cutout (1b) facing the vehicle floor (31), and a third trim panel (8) that extends in the direction of the B pillar between the door cutouts (1a, 1b). The trim panels (2a, 2b, 8) compensate for tolerances during assembly of the interior trim so that the first and second trim panels (2a, 2b) can be shifted relative to each other in the longitudinal direction, and the third trim panel (8) and the first and second trim panels (2a, 2b) can be shifted relative to each other in the vertical direction.

12 Claims, 11 Drawing Sheets

INTERIOR TRIM OF A MOTOR VEHICLE

CROSS REFERENCE TO RELATED APPLICATION

This application claims priority under 35 USC 119 to German Patent Appl. No. 10 2018 121 472.3 filed on Sep. 4, 2018, the entire disclosure of which is incorporated herein by reference.

BACKGROUND

Field of the Invention

The invention relates to an interior trim of a motor vehicle.

Related Art

A motor vehicle has a motor vehicle body. The motor vehicle body has a floor, an A pillar, a B pillar and door cutouts into which motor vehicle doors are inserted. Door cutouts of sedans, sedan-like vehicles or SUVs are positioned on both sides of the motor vehicle in the region of each B pillar on both sides of the respective B pillar to place a front door on each side of the motor vehicle and to place a rear door in front or behind the B pillar.

The motor vehicle body defines an interior of the motor vehicle, and assemblies of the motor vehicle body are covered in the interior region via an interior trim. The present invention relates to an interior trim of a motor vehicle for covering sections of the door cutouts of the motor vehicle body that face the floor of the motor vehicle body. The door cutouts are bounded or defined by a B pillar extending in the vertical direction of the motor vehicle and by longitudinal struts extending laterally next to the respective B pillar in the longitudinal direction of the motor vehicle. Known interior trims known have visually apparent and unsightly transitions between adjacent trim panels. This is because manufacturing tolerances or assembly tolerances of adjacent trim panels of the interior trim cannot be compensated for sufficiently.

WO 2017/103366 A1 and DE 10 2008 052 966 A1 disclose interior trims according to the prior art.

It is an object of the invention to provide an interior trim of a motor vehicle that permits better covering of sections of door cutouts of a motor vehicle body that face a floor of the motor vehicle body.

SUMMARY

An interior trim in accordance with the invention comprises at least a first trim panel, a second trim panel and a third trim panel.

The first trim panel of the interior trim covers a section of a first door cutout facing the vehicle floor. The first trim panel has a first trim panel section extending in the direction of the respective longitudinal strut and a second trim panel section extending in the direction of the B pillar.

The second trim panel of the interior trim covers a section of a second door cutout facing the vehicle floor. The second trim panel has first and second trim panel sections. The first section of the second trim panel extends in the direction of the respective longitudinal strut. The second section of the second trim panel extends in the direction of the B pillar and is adjacent to the second trim panel section of the first trim panel with or without overlapping.

The third trim panel of the interior trim extends in the direction of the B pillar. The third trim panel cover the B pillar in sections and is adjacent to the second trim panel section of the first trim panel and to the second trim panel section of the second trim panel with or without overlapping.

The first trim panel, second trim panel and third trim panel are designed to compensate for tolerances during the assembly of the interior trim. The first trim panel and the second trim panel can be shifted relative to each other in the longitudinal direction. Furthermore, the third trim panel and the first and second trim panels can be shifted relative to one another in the vertical direction and therefore in the direction of the B pillar.

The ability of the trim panels of the interior trim to be shifted relative to one another permits an advantageous and visually attractive covering of the interior in the region of the sections of door cutouts facing the floor of the motor vehicle body.

The trim panels disclosed herein make it possible to cover sections of the B pillar facing the floor and longitudinal struts that are adjacent to those sections of the B pillar, as well as sections that run adjacent to the floor of the motor vehicle body and that together with the B pillar bound the door cutouts in sections.

Manufacturing tolerances and assembly tolerances can be compensated for by the relative movement of the at least three trim panels with respect to one another.

The first trim panel may be U-shaped and may have a third trim panel section extending in the vertical direction and therefore in the direction of the A pillar. The second and third trim panel sections are arranged at opposite ends of the first trim panel section. The second trim panel also may be U-shaped and has a third trim panel section extending in the vertical direction and therefore in the direction of the C pillar. The second and third trim panel sections may be arranged at opposite ends of the second trim panel section. With such first and second trim panels, that section of the door cutouts that face the floor can be covered optimally.

The first and second trim panels of one embodiment can be shifted relative to each other in the longitudinal direction so that an overlapping between the second trim panel sections of the first and second trim panels can be adjusted. This relative movement permits an advantageous covering of sections of the door cutouts facing the floor of the motor vehicle body. For this purpose, guides may be formed on a segment or edge of the second trim panel section of the first trim panel facing the second trim panel section of the second trim panel, and on a segment or edge of the second trim panel section of the second trim panel facing the second trim panel section of the first trim panel. These guides engage each other and permit a relative movement between the first and second trim panel in the longitudinal direction.

Guides of this type permit relative shifting between the first and second trim panels in the longitudinal direction but prevent shifting in the vertical direction.

According to a first alternative, the third trim panel and the first trim panel can be shifted relative to each other exclusively in the vertical direction in such a manner that, according to the first alternative, an overlapping between the third trim panel and the second trim panel section of the first trim panel can be adjusted in the vertical direction. For this purpose, guides are formed, according to the first alternative, on the second trim panel section of the first trim panel, on a segment or edge facing the third trim panel, and on the third trim panel, said guides permitting the relative movement exclusively in the vertical direction. Thus, the third trim panel and the second trim panel can be shifted relative to each other both in the vertical direction and in the longitudinal direction in such a manner that, according to the first alternative, an overlapping between the third trim panel and the second trim panel section of the second trim panel can be adjusted in two directions. For this purpose, guides are formed, according to the first alternative, on the second trim panel section of the second trim panel, on a segment or edge facing the third trim panel, and on the third trim panel, said guides permitting the relative movement in the vertical direction and in the longitudinal direction.

According to a second alternative, the third trim panel and the second trim panel can be shifted relative to each other exclusively in the vertical direction in such a manner that an overlapping between the third trim panel and the second trim panel section of the second trim panel can be adjusted in the vertical direction. For this purpose, guides are formed on the second trim panel section of the second trim panel, on a segment or edge facing the third trim panel, and on the third trim panel. These guides permit the relative movement exclusively in the vertical direction. According to an advantageous development of the invention, then, according to the second alternative, the third trim part and the first trim part can be shifted relative to each other both in the vertical direction and in the longitudinal direction in such a manner that an overlapping between the third trim part and the second trim part section of the first trim part can be adjusted in two directions. For this purpose, guides are formed on the second trim panel section of the first trim panel, on a segment or edge facing the third trim panel, and on the third trim panel. These guides permit relative movement in the vertical direction and in the longitudinal direction.

The shifting capability of the third trim panel according to the first and second alternatives in combination with the shifting capability of the first and second trim panels permit optimum covering of sections of the door cutouts that face the floor of the motor vehicle body.

Preferred developments of the invention emerge from the dependent claims and the description below. Exemplary embodiments of the invention will be explained in more detail, without being restricted thereto, with reference to the drawing.

DETAILED DESCRIPTION

The invention relates to an interior trim of a motor vehicle for covering sections of door cutouts of a motor vehicle body, said sections facing a floor of the motor vehicle body.

Figure 1:
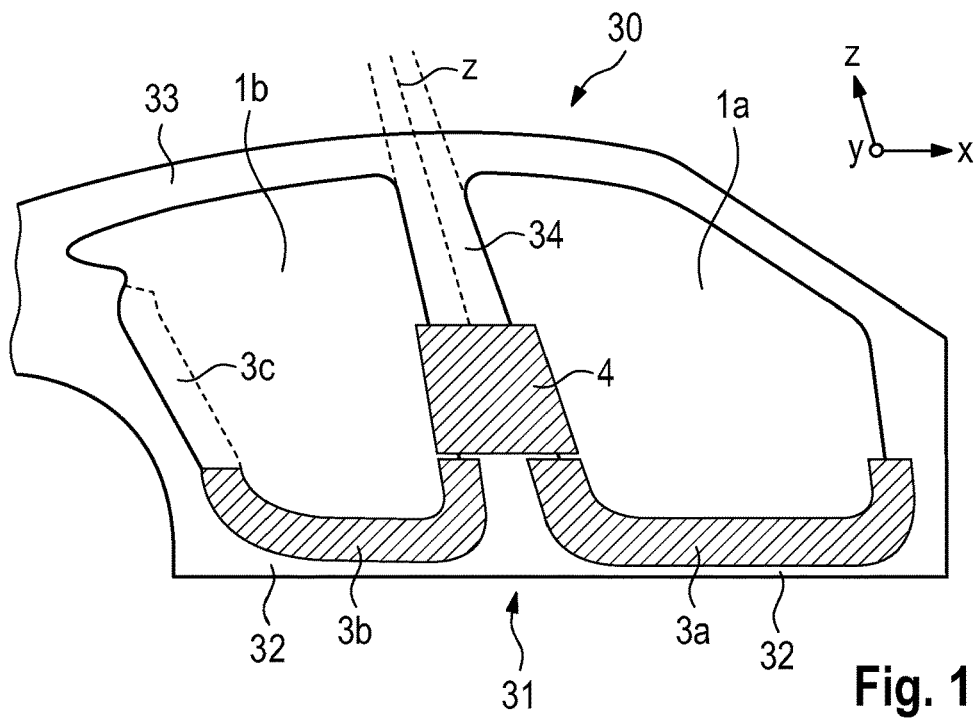
FIG. 1 is a schematic illustration of a motor vehicle body in the region of two door cutouts separated by a B pillar.

FIG. 1 is a schematic side view of a motor vehicle body 30 in the region of a floor 31 and of a B pillar 34. Door cutouts 1a and 1b, into which motor vehicle doors can later be inserted, are formed in front of and behind the B pillar 34. A front door can be inserted into the door cutout 1a and a rear door into the door cutout 1b. The two door cutouts 1a and 1b are separated from each other by the B pillar 34. Accordingly, the B pillar 34 bounds the door cutouts 1a and 1b in sections. At a lower section, specifically in a section facing the floor 31, the door cutouts 1a and 1b are bounded by longitudinal struts 32 which run in front of the B pillar 34 in the region of the door cutout 1a and behind the B pillar 34 in the region of the door cutout 1b. In a section facing away from the floor 31, the door cutouts 1a, 1b are bounded by a roof structure 33 of the motor vehicle body 30.

The motor vehicle body 30 is covered with an interior trim in the region of the interior. The invention relates to an interior trim that covers sections 3a, 3b and 4 of the door cutouts 1a and 1b that face the floor 31 of the motor vehicle body 30, as shown in FIG. 1.

Figure 2:
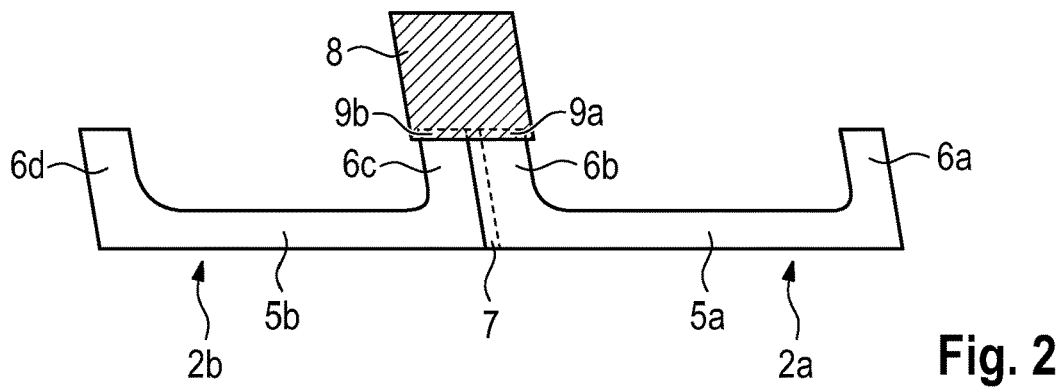
FIG. 2 shows a first schematic illustration of trim panels of an interior trim according to the invention.
Figure 3:
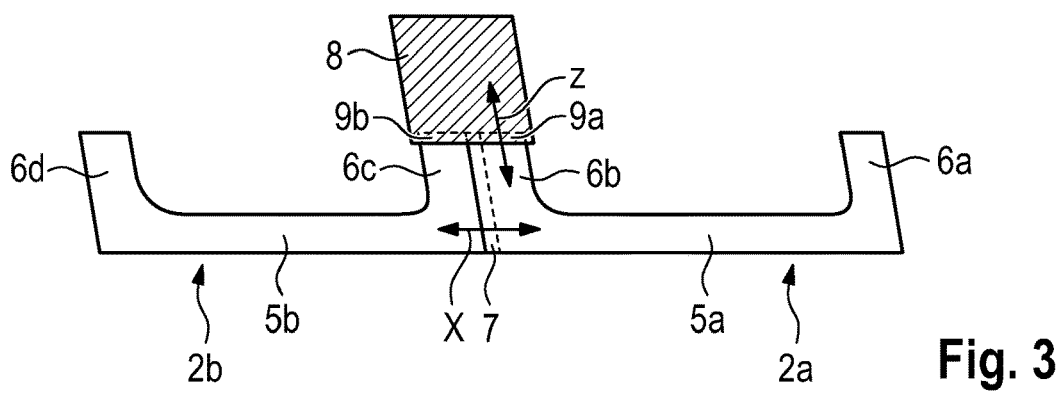
FIG. 3 shows a second schematic illustration of trim panels of an interior trim according to the invention.

FIGS. 2 and 3 are highly schematic views of an interior trim according to the invention for covering the sections 3a, 3b and 4 of the door cutouts 1a and 1b.

The interior trim according to an embodiment of the invention has a first trim panel 2a, a second trim panel 2b and a third trim panel 8

The first trim panel 2a is configured for covering a section 3a of the first door cutout 1a facing the vehicle floor 31. The first trim panel 2a has a first trim panel section 5a extending in the direction of the respective longitudinal strut 32 and a second trim panel section 6b extending in the direction of the B pillar 34.

The second trim panel 2b is configured for covering the section 3b of the second door cutout 1b that faces the vehicle floor 31. The second trim panel 2b has a first trim panel section 5b extending in the direction of the respective longitudinal strut 32 and a second trim panel section 6c that extends in the direction of the B pillar 34 and is adjacent to the second trim panel section 6b of the first trim panel 2a with or without overlapping.

The third trim panel 8 is configured for covering the section 4 (see FIG. 1) of the door cutouts 1a, 1b. The third trim panel section 8 extends in the direction of the B pillar 34 and is adjacent to the second trim panel section 6b of the first trim panel 2a and to the second trim panel section 6c of the second trim panel 2b with or without overlapping.

FIGS. 2 and 3 show overlapping regions 7 and 9a, 9b. An overlapping region 7 is formed between the second trim panel sections 6b, 6c of the first trim panel 2a and second trim panel 2b. The further overlapping regions 9a and 9b are formed respectively between the third trim panel 8 and the second trim panel section 6b and 6c of the first trim panel 2a and second trim panel 2b.

To optimally align the trim panels 2a, 2b and 8 with respect to one another in the assembly process of the motor vehicle and to compensate for assembly tolerances and manufacturing tolerances, the first trim panel 2a and the second trim panel 2b can be shifted relative to each other in the x direction and therefore in the longitudinally in the direction of the double arrow X. The third trim panel 8 can be shifted relative to the first trim panel 2a and relative to the second trim panel 2b at least in the z direction or in the vertical direction in the direction of the double arrow Z. The z direction (see FIG. 1) is defined as an angle bisector between the lateral edges of the B pillar 34 and accordingly runs substantially in the vertical direction.

Accordingly, the z direction or vertical direction is defined as an angle bisector between extensions of the edges of the B pillar 34, with the edges bounding the door cutouts 1a and 1b in the region of the B pillar 34.

As can best be gathered from FIGS. 2 and 3, the first trim panel 2a and the second trim panel 2b are U-shaped. Accordingly, the first and second trim panels 2a and 2b have third trim panel sections 6a and 6d in addition to the first trim panel sections 5a and 5b and the second trim panel sections 6b and 6c.

The third trim panel sections 6a, 6d of the trim panels 2a, 2b extend substantially vertically and hence parallel to the second trim panel section 6b, 6c of the trim panels 2a and 2b. Thus, on both the first and second trim panels 2a and 2b the respective second trim panel sections 6b and 6c and the respective third trim panel sections 6a and 6d are at different ends of the first trim panel sections 5a and 5b.

The shifting of the first trim panel 2a and second trim panel 2b in the longitudinal direction (i.e. the direction of the double arrow X in FIG. 3) enables the overlapping region 7 between the second trim panel section 6b of the first trim panel 2a and the second trim panel section 6c of the second trim panel 2b to be adjusted.

For this purpose, guides (which are not visible in FIGS. 2 and 3) are in each case formed on the second trim panel section 6b of the first trim panel 2a and on the second trim panel section 6c of the second trim panel 2b. The guides engage in each other in a form-fitting manner and permit exclusively a one-dimensional relative movement in the longitudinal direction (arrow X). The guides can be designed in the form of a tongue and groove guide. The guides in each case are formed on segments or edges of the second trim panel sections 6b, 6c of the two trim panels 2a, 2b, with the segments or edges facing the respectively other trim panel 2b, 2a.

The third trim panel 8 and the first and second trim panels 2a, 2b can be shifted relative to one another in the vertical direction so that the overlapping regions 9a, 9b between the third trim panel 8 and the second trim panel sections 6b, 6c of the first trim panel 2a and second trim panel 2b can be adjusted. For this purpose, guides, which are not visible in FIGS. 2 and 3, are formed on facing surfaces the second trim panel sections 6b, 6c of the two trim panels 2a, 2b and on the third trim panel 8. The guides interact and permit a defined relative movement. In particular, the guides permit a one-dimensional relative movement in the vertical direction (double arrow Z) between the third trim panel 8 and one of the trim panels of the first and second trim panels 2a, 2b, for example the first trim panel 2a, and a two-dimensional relative movement in the longitudinal direction (double arrow X) and vertical direction (double arrow Z) between the third trim panel 8 and the other of the trim panels of the first and second trim panels 2a, 2b, for example the second trim panel 2b.

The two trim panels 2a, 2b provided for the interior-side covering of the sections 3a, 3b (shown in FIG. 1) of the door cutouts 1a, 1b are U-shaped in the y projection—i.e. in the side view of the motor vehicle. The trim panels 2a, 2b extend with their trim panel sections 5a, 5b in each case on the vehicle floor side along the horizontal profile of the door cutout 1a, 1b or of the longitudinal struts 32 and, at both ends, in each case have the trim panel sections 6a, 6b, 6c, 6d which in each case cover the transition from the horizontal to the vertical door cutout 1a, 1b. The second trim panel section 6b of the first trim panel 2a and the second trim panel section 6c of the second trim panel 2b have the overlapping 7 or, without overlapping 7, produce a joint at which vertical flank edges of the trim panel sections 6b, 6c lie opposite one another. A lower edge of the third trim panel 8, which is preferably of shell-like or cup-like design in cross section, covers upper edges of the trim panel sections 6b, 6c of the first and second trim panels 2a, 2b in the form of the overlaps 9a, 9b. As an alternative thereto, the lower edge of the third trim panel 8 without overlapping forms a joint with the upper edge of the trim panel sections 6b, 6c.

The body sections extending along the door cutouts 1a, 1b are subject to manufacturing, assembly and joining tolerances. This effect has an impact on the trim panels 2a, 2b, 8 in the form of positional tolerances along the door cutouts 1a, 1b, particularly since said trim panels are subject to production tolerances.

The interior trim according to the invention provides a tolerance compensation that compensates for the positional tolerances acting on the trim panels 2a, 2b, 8 in the x and z direction and increases the visual quality of the interior-side trim. A relative movement in the z direction is possible between the first trim panel 2a and the third trim panel 8. A relative movement in the x direction is possible between the first trim panel 2a and the second trim panel 2b. A relative movement in the x and z direction is possible between the second trim panel 2b and the third trim panel 8.

FIGS. 4 to 24 show a specific structural design of the interior trim.

FIGS. 4 to 7 show details of the trim panel section 6b of the trim panel 2a.

Figure 8:
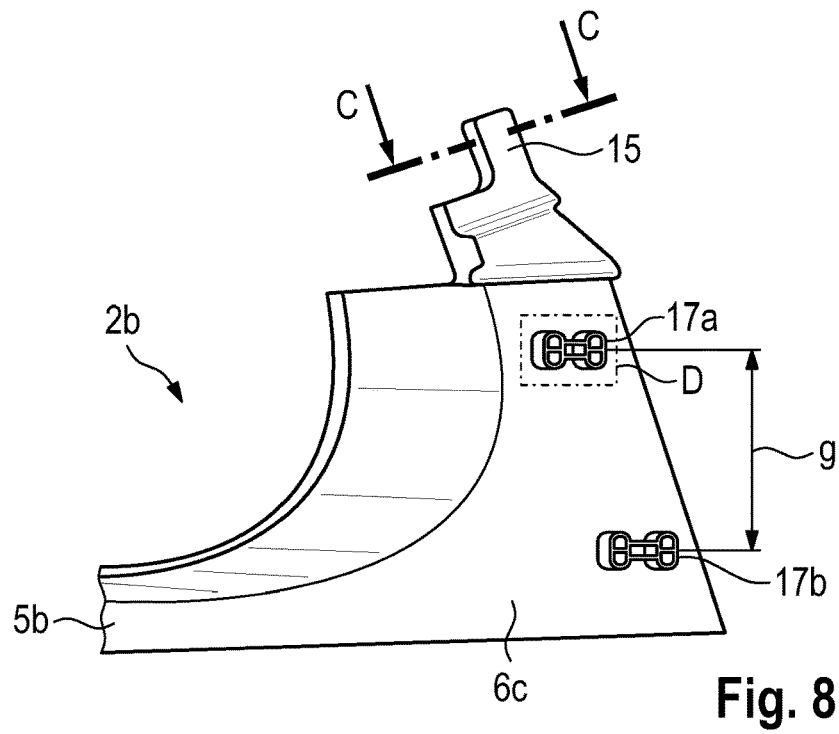
FIG. 8 shows a detail of a second trim panel of an interior trim according to the invention.
Figure 9:
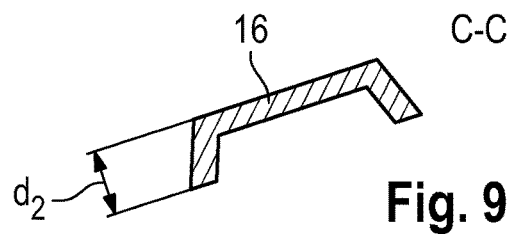
FIG. 9 shows the cross section C-C from FIG. 8.
Figure 10:
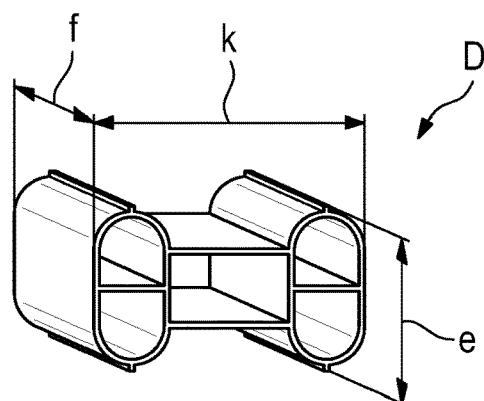
FIG. 10 shows the detail D from FIG. 8.

FIGS. 8 to 10 show details of the trim panel section 6c of the trim panel 2b.

FIGS. 11 to 17 show details of the third trim panel 8.

FIGS. 18 to 24 each show the cooperation of two trim panels 2a and 2b, 2a and 8 or 2b and 8 or the cooperation of all of the trim panels 2a, 2b and 8 in the respective overlapping region of same.

Figure 4:
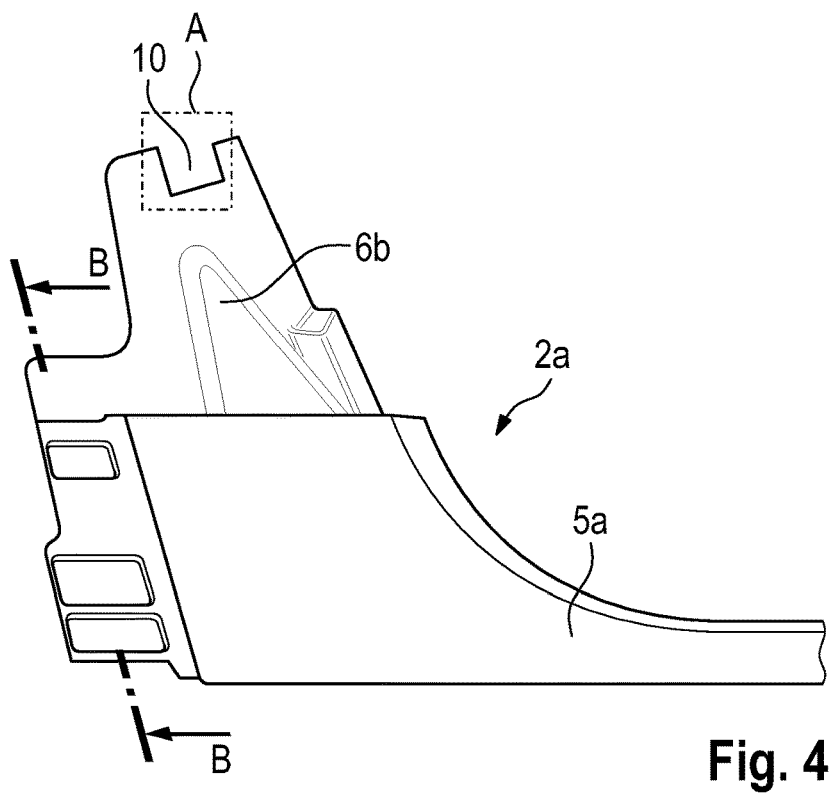
FIG. 4 shows a detail of a first trim panel of an interior trim according to the invention.
Figure 5:
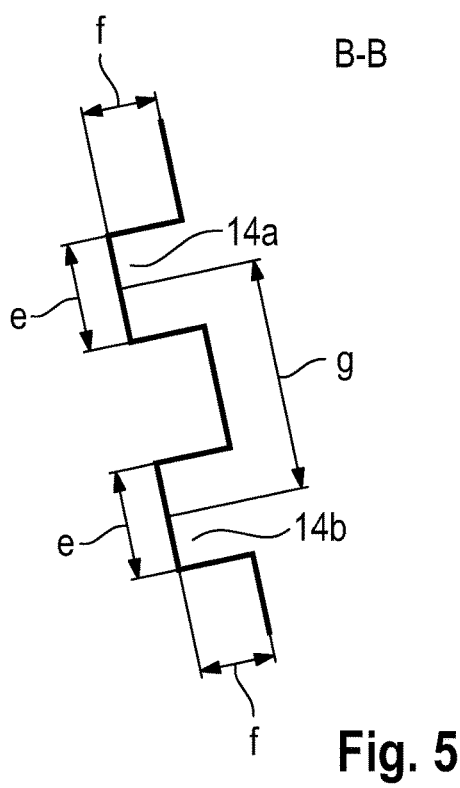
FIG. 5 shows the cross section B-B from FIG. 4.
Figure 6:
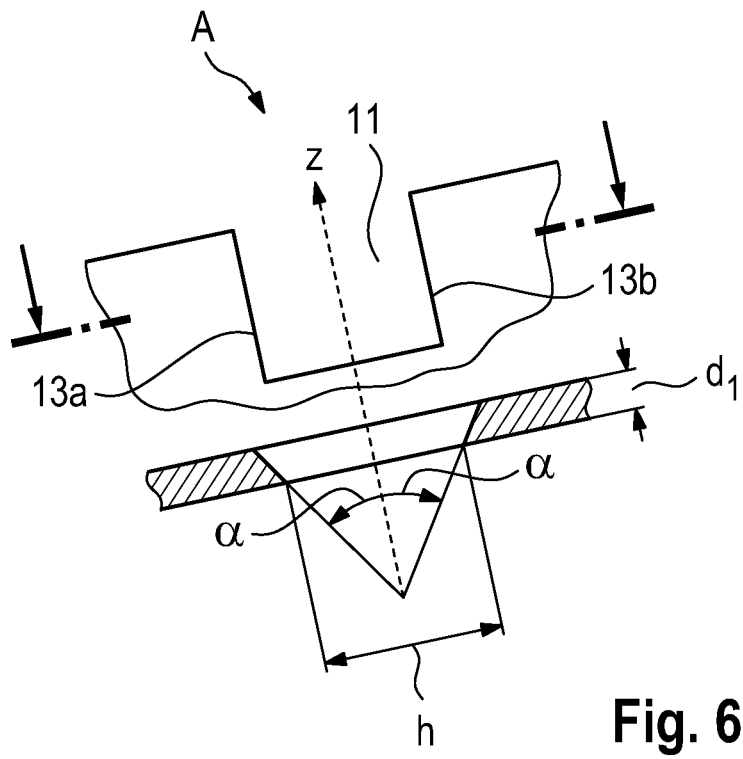
FIG. 6 shows the detail A from FIG. 4.
Figure 7:
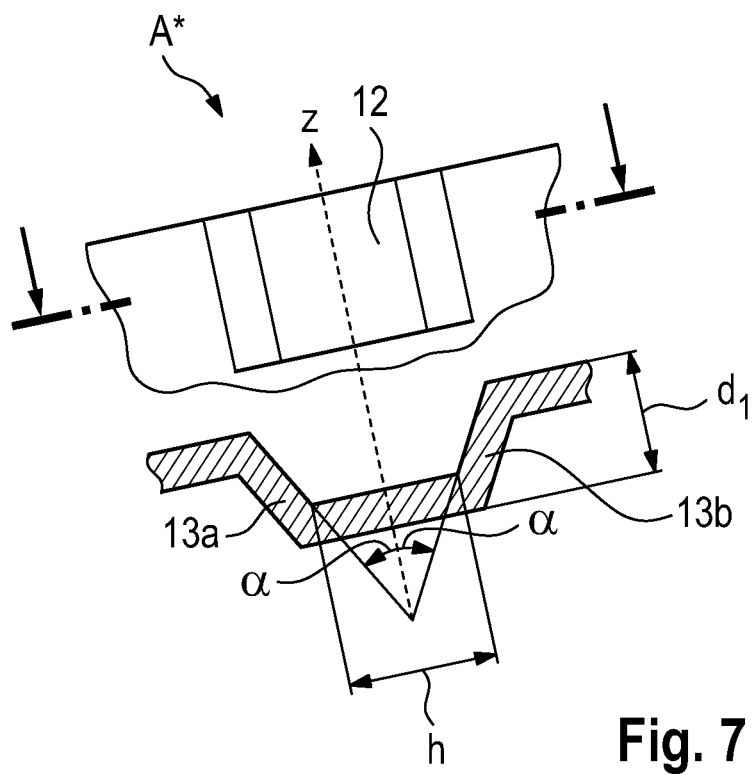
FIG. 7 shows an alternative detail A* to the detail A.

In the specific design of the interior trim, according to FIG. 4 the upper edge of the second trim panel section 6b of the first trim panel 2a has a pocket 10 in the region of the overlap 9a, wherein the pocket 10 either is open as a U-shaped recess 11 (FIG. 6, detail A) to the upper edge of the second, here rear, trim panel section 6b of the first, here front, trim panel 2a, or is open in the form of a projection 12 (FIG. 7, detail A*), pointing toward the section 4, to the upper edge of the second trim panel section 6b of the first trim panel 2a.

In each case, the pocket 10 has an overall dimension d1 extending in the y direction or transverse direction and lateral flanks 13a, 13b according to detail A (FIG. 6) or detail A* (FIG. 7) which are parallel to each other at a distance h, run in the z direction and expand mirror-symmetrically in the y direction at an angle α.

Furthermore, in the flank, pointing toward the second trim panel 2b, of the trim panel section 6b of the front trim panel 2a, there are at least two groove-like depressions 14a, 14b with the clear width e and the depth f according to section B-B (FIG. 5), which depressions are accessible on the vehicle interior side and run parallel to each other in the x direction at the distance g.

The upper edge of the second trim panel section 6c of the second trim panel 2b is provided with a finger-like projection 15 (FIG. 8) on the side facing away from the vehicle interior. Said projection is located in the region of the overlapping 9b, has a cover surface 16 arranged parallel to the xz plane, on the side pointing toward the vehicle interior, and is characterized by the overall dimension d2 in the y direction.

On that side of the second trim panel section 6c of the second trim panel 2b that faces away from the vehicle interior, there are at least two projections 17a, 17b (FIG. 8), the outer dimensions (detail D, FIG. 10) of which each correspond to a cuboid having the height e, the depth f and the length k, where k>>e, and which are positioned at a distance g with respect to one another and geometrically conceived in such a manner that they enter into a form-fitting connection, which is movable in a play-free manner exclusively in the x direction, with the groove-like depressions 14a, 14b, which run parallel to each other in the x direction, of the second trim panel section 6b of the first trim panel 2a.

The geometry of the projections 17a, 17b within the cuboid, said geometry being projected in each case in the y direction onto the base area of the second trim panel section 6c of the second trim panel 2b, can be configured diversely taking into account the demolding of the mold segments, which preferably act in a primary forming manner for the production of the trim panels 2a, 2b, 8, and can be designed as an arrangement of slats or packet of ribs oriented unidirectionally and parallel to one another, as a rectangle filled with at least one cross rib arrangement, or in a dumbbell-shaped or bone-shaped manner, as illustrated in detail D (FIG. 10).

Figure 11:
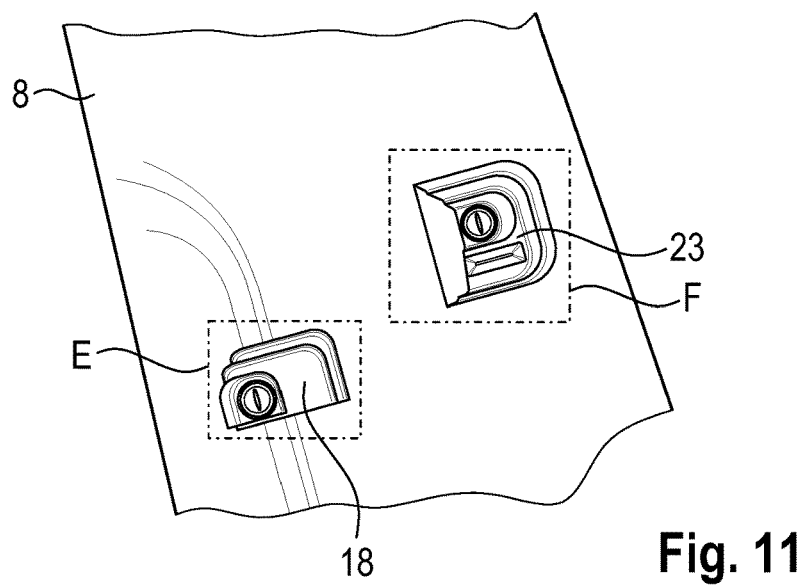
FIG. 11 shows a detail of a third trim panel of an interior trim according to the invention.
Figure 12:
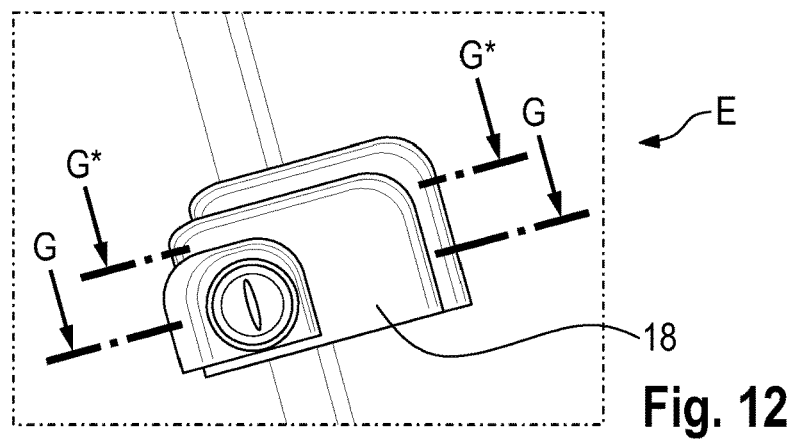
FIG. 12 shows the detail E from FIG. 11.
Figure 13:
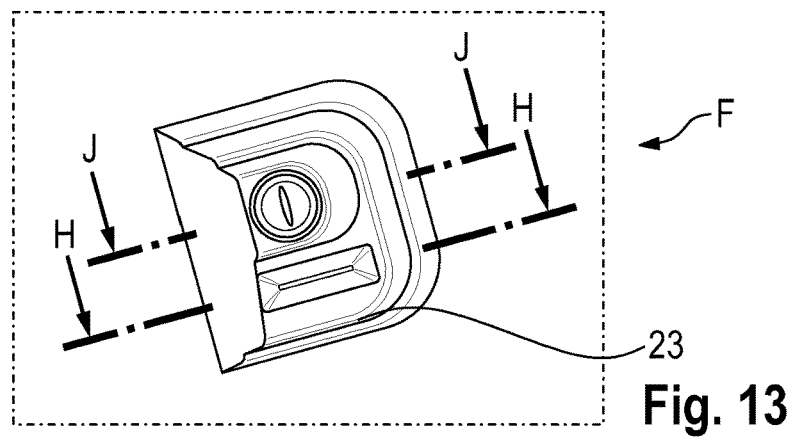
FIG. 13 shows the detail F from FIG. 11.
Figure 14:
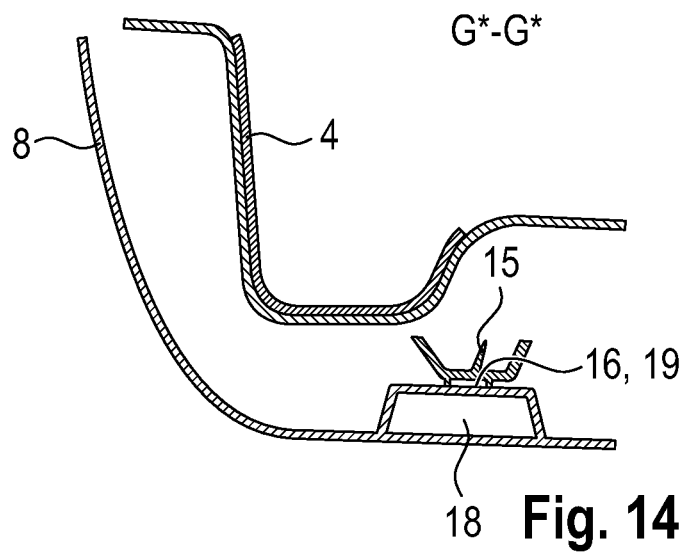
FIG. 14 shows the cross section G*-G* from FIG. 12.
Figure 15:
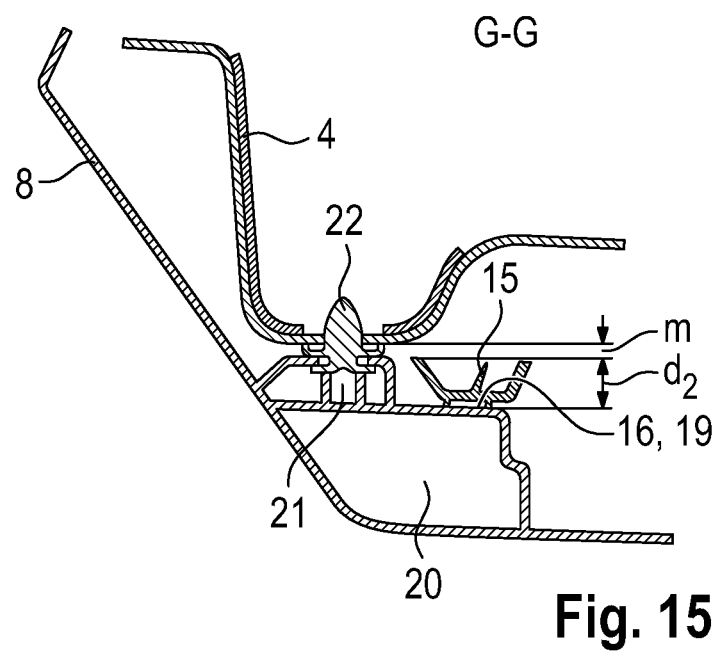
FIG. 15 shows the cross section G-G from FIG. 12.
Figure 16:
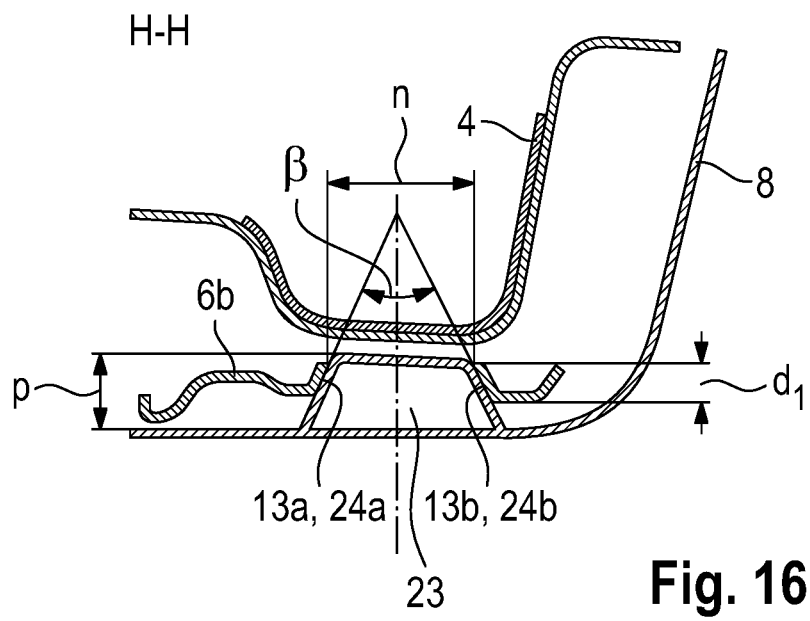
FIG. 16 shows the cross section H-H from FIG. 13.
Figure 17:
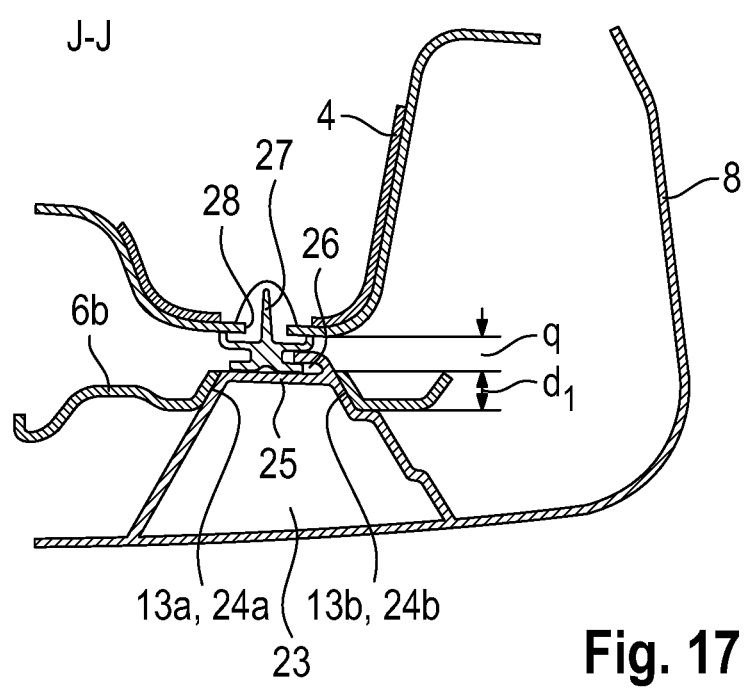
FIG. 17 shows the cross section J-J from FIG. 13.
Figure 18:
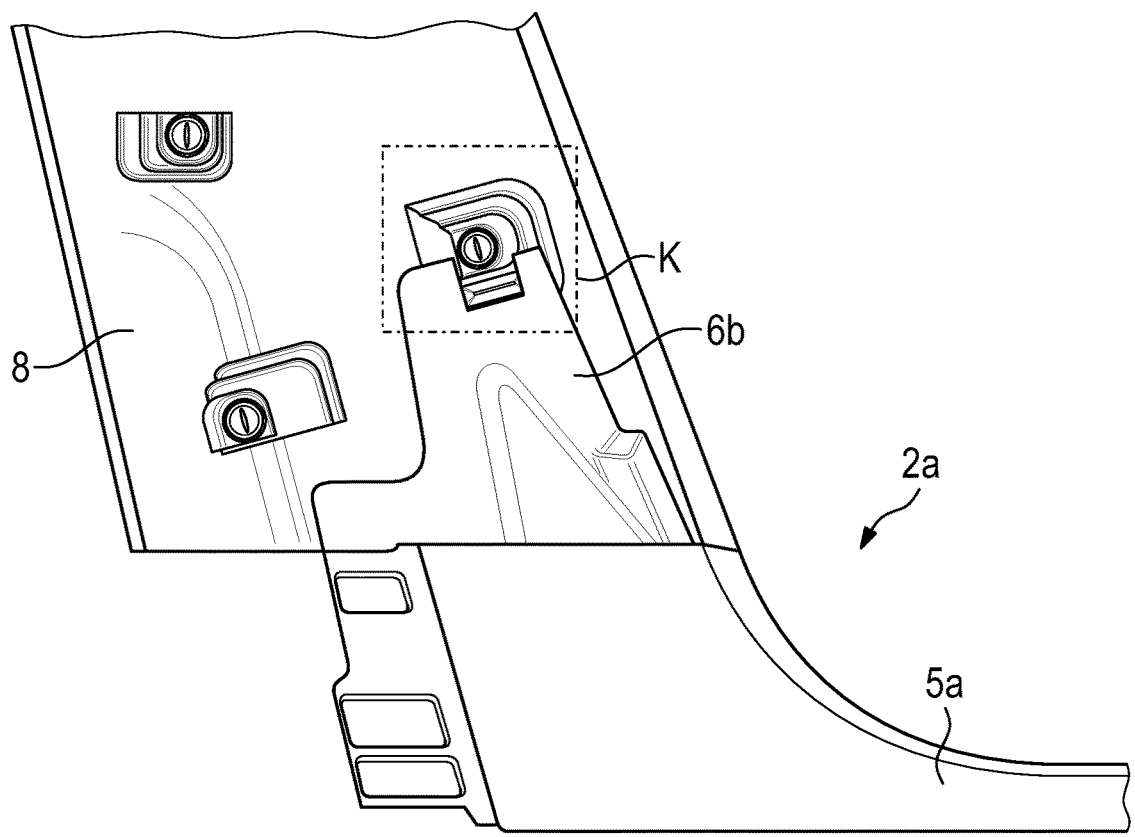
FIG. 18 shows the detail from FIG. 4 in cooperation with the detail from FIG. 11.
Figure 19:
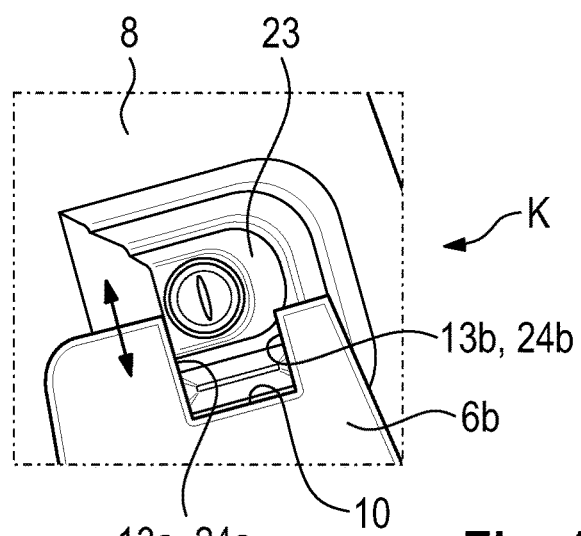
FIG. 19 shows the detail K from FIG. 18.

The third trim panel 8 has two projections 18, 23 on the side facing away from the vehicle interior (FIG. 11). The projection 18 has an end surface 19 arranged parallel to the xz plane and, according to section G*-G* (FIG. 14), lies plane-parallel, preferably without a distance, opposite the cover surface 16 of the finger-like projection 15 on the upper edge of the second trim panel section 6c of the second trim panel 2b.

As an alternative thereto, the end surface 19 that is parallel to the xz plane and lies without a distance plane-parallel opposite the cover surface 16 of the finger-like projection 15 on the upper edge of the second trim panel section 6c of the second trim panel 2b is located on a projection 20, according to section G-G (FIG. 15), said projection being of roof-like design in the y direction and at the same time containing a receptacle 21 for a connecting element 22 generating prestressing force in the y direction, in particular a clip.

In this case, the connecting element 22 generating prestressing force fixes either the third trim panel 8 on the section 4 with the effect that, according to section G-G (FIG. 15), the end surface 19 of the projection 20 and the cover surface 16 of the finger-like projection 15, which is designed with the overall dimension d2, lie on each other in a plane-parallel manner without a distance on the upper edge of the second trim panel section 6c of the second trim panel 2b and at the same time a distance m is ensured between the finger-like projection 15 and the section 4, or the connecting element 22 generating prestressing force fixes the third trim panel 8 on the section 4 and clamps the finger-like projection 15, which is designed with the overall dimension d2, via its cover surface 16 between the end surface 19 of the projection 20 and the section 4 such that no distance m is present.

The projection 23 is placed on that side of the third trim panel 8 which faces away from the vehicle interior and, according to section H-H (FIG. 16), has the dimension p in the y direction, said dimension at least being the same size as the dimension d1, by means of which the extent of the pocket 10 running in the y direction is characterized in the region of the overlapping 9a on the second trim panel section 6b of the first trim panel 2a.

In addition, the side flanks 24a, 24b of the projection 23 run at the distance n, which corresponds at maximum to the distance h of the lateral flanks 13a, 13b of the pocket 10 on the upper edge of the second trim panel section 6b of the first trim panel 2a, parallel to each other in the z direction and expand mirror-symmetrically in the y direction at an angle ß which is identical to the angle α between the lateral flanks 13a, 13b of the pocket 10.

The lateral flanks 13a, 13b of the pocket 10 and the side flanks 24a, 24b of the projection 23 lie on one another in a plane-parallel manner without a distance and without play and form a guide in this configuration.

As an alternative thereto, the projection 23 according to section J-J (FIG. 17) is designed similarly to a truncated pyramid, the cover surface 25 of which, which is parallel to the xz plane, is provided with a receptacle 26 for a connecting element 27 generating prestressing force in the y direction, in particular a clip. In this case, the connecting element 27 generating prestressing force fixes either the third trim panel 8 on the section 4 with the effect that, according to section J-J (FIG. 17), the two lateral flanks 13a, 13b of the pocket 10, which is designed with the overall dimension d1, on the upper edge of the second trim panel section 6b of the first trim panel 2a and the two side flanks 24a, 24b, as a lateral surface component of the projection 23 designed similarly to a truncated pyramid, lie on one another in a plane-parallel manner without a distance and at the same time a distance q is ensured between the upper edge of the second trim panel section 6b of the first trim panel 2a, in which the pocket 10 is located, and the section 4, or the connecting element 27 generating prestressing force fixes the third trim panel 8 on the section 4 and clamps the upper edge of the second trim panel section 6b of the first trim panel 2a via a form-fitting connection, which comes about by the lateral flanks 13a, 13b, which are located there, of the pocket 10 designed with the overall dimension d1 resting in a plane-parallel manner without a distance on the two side flanks 24a, 24b of the projection 23 designed similarly to a truncated pyramid, between a lateral segment of the projection 23 on the third trim panel 8 and the section 4 such that a distance q is not present.

With the above-described specific design, account is taken of the following points:

First, relative movability is ensured in the z direction between the first trim panel 2a and the third trim panel 8. This is ensured, according to FIGS. 18 and 19, by the form-fitting connection that acts in the manner of a slotted guide in the z direction, between the side flanks 24a, 24b of the projection 23 on the trim panel 8 and the lateral flanks 13a, 13b of the pocket 10 on the upper edge of the second trim panel section 6b of the first trim panel 2a.

Second, the relative movability is ensured in the x direction, between the first trim panel 2a and the second trim panel 2b. This is ensured, according to FIGS. 20 and 21, by the form-fitting connection between the groove-like depressions 14a, 14b in the flank, which points toward the second trim panel 2b, of the second trim panel section 6b of the first trim panel 2a and the projections 17a, 17b on the second trim panel section 6c of the second trim panel 2b. Under the premise k>>e according to detail D (FIG. 10), the projections 17a, 17b are guided precisely in the x direction in the groove-like depressions 14a, 14b that run parallel to each other in the x direction. By means of this geometrical configuration of the first and second trim panels 2a, 2b in the region of the overlapping 7 analogously to a guide consisting of at least two tracks, it is ensured that, between the first trim panel 2a and the second trim panel 2b, no angular deviations occur from the x direction within the xz plane, said deviations leading on the vehicle interior side to a non-parallel join between the opposite trim panel sections 6b, 6c, and no positional tolerances occur in the z direction.

Figure 22:
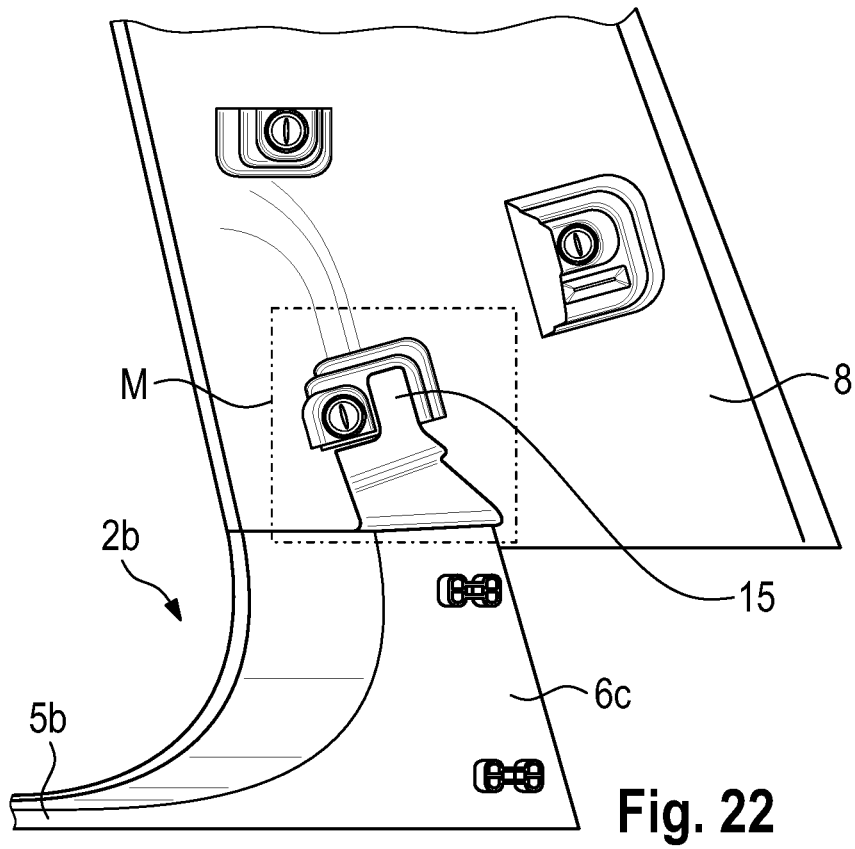
FIG. 22 shows the detail from FIG. 8 in cooperation with the detail from FIG. 11.
Figure 23:
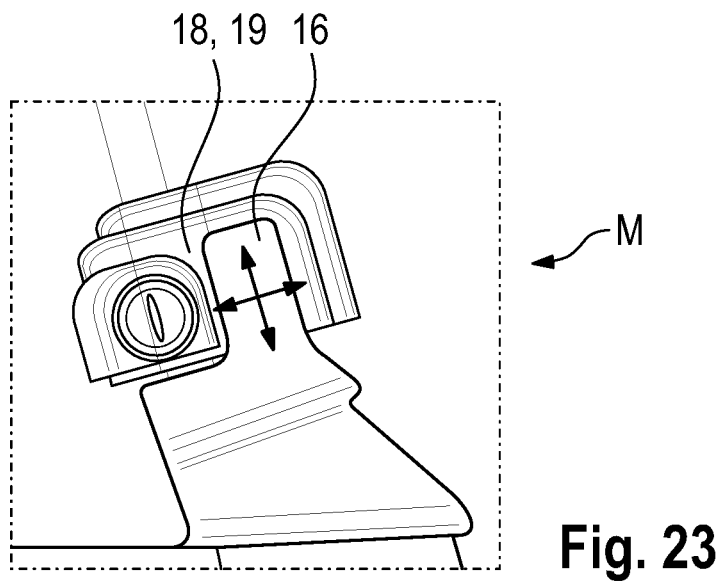
FIG. 23 shows the detail M from FIG. 22.

Third, the relative movability is ensured in the x and z direction, between the second trim panel 2a and the third trim panel 8. This is ensured by, as FIGS. 22 and 23 show, the cover surface 16 of the finger-like projection 15 on the upper edge of the second trim panel section 6c of the second trim panel 2b and the end surface 19 of the projection 18 on the third trim panel 8 lying in a plane-parallel manner on each other without a distance in the xz plane and, in this state, being displaceable with respect to each other in two directions—i.e. in the x and z direction.

Figure 24:
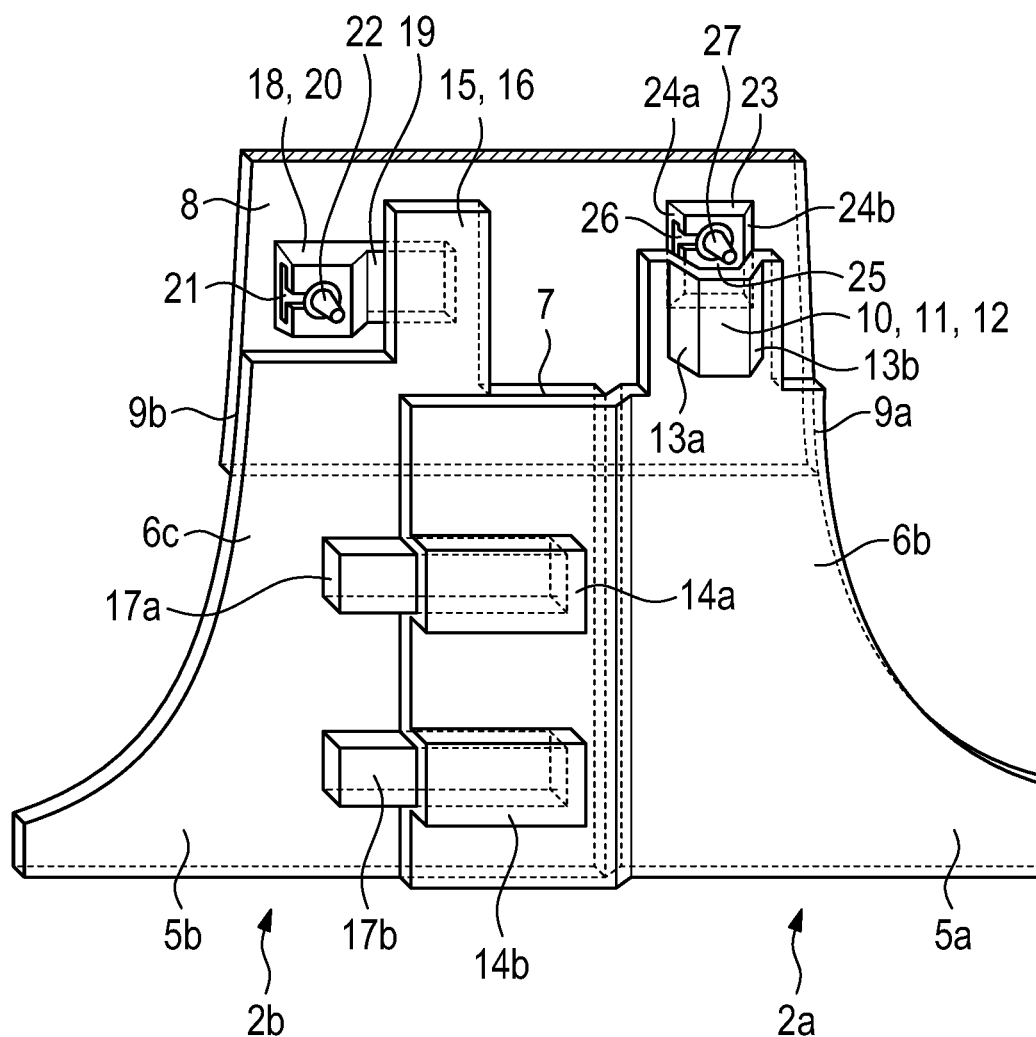
FIG. 24 shows the detail from FIG. 4 in cooperation of the details from FIG. 8 and FIG. 11.

FIG. 24 summarizes the geometrical overall configuration between the first trim panel 2a, the second trim panel 2b and the third trim panel 8 that is preferably used for the interior-side covering of the lower section of door cutouts 1a, 1b in the sidewall of a motor vehicle body.

In view of the fact that the third trim panel section 6d (illustrated in FIGS. 2 and 3) of the second trim panel 2b can be extended as far as a flange edge line—i.e. as far as a lower edge of the cutout, which can be seen in FIG. 1, for the irremovable vehicle glazing adjacent to a rear door, such that at the same time the sections 3b, 3c sketched in FIG. 1 can be covered with the second trim panel 2b, a reduction in the number of components for the interior-side trim of the sections 3a, 3b, 3c shown in FIG. 1 arises. The vehicle production costs are thereby reduced.

With the invention, the impression of high quality, i.e. the quality of the joins and the overall visual appearance of the trim of the sections 3a, 3b, 3c that is visible in front of the vehicle occupant in the vehicle interior can be increased.

According to FIG. 3, the third trim panel 8 can be moved in the z direction relative to the trim panels 2a, 3b. Accordingly, it is possible to place the visual effects of the tolerances which occur during the covering of the section 4 of the B pillar into the joint or overlapping region 9a, 9b of FIG. 3, said region being located in the vehicle interior footwell which is illuminated only a little by daylight, and is additionally removed from direct view of the vehicle occupant because of the ergonomic inaccessibility.

The shifting of the tolerance compensating point into the footwell of the vehicle interior makes it possible for a visually attractive joint between an upper edge of the third trim panel 8 and a lower edge of a trim panel arranged above the third trim panel 8. The joint has a very small join dimension and constant, i.e. jump- and kink-free, profiles of body-side seals along the door cutouts 1a, 1b.

These features have a positive impact on the impression of high quality because the region between the upper edge of the third trim panel 8 and the lower edge of the trim panel which is arranged above the third trim panel 8 lies in the direct viewing region especially of the rear occupant, is illuminated by daylight and generally can even be seen in to on the exterior side via the door glazing.

If the contact point between the lower edge of the third trim panel 8 and the upper edges of the second trim panel sections 6b, 6c of the first and second trim panels 2a, 2b, said contact point being movable in the z direction with respect to one another, is an overlap 9b, 9a with an end of the lower edge of the third trim panel 8 that is rounded or beveled in a wedge-shaped manner, the additional advantages arise that the extent of the tolerances does not exert any influence on the quality of the join along the lower edge of the third trim panel 8, and no projections pointing in each case into the vehicle interior and being perceptible as visually annoying light edges when affected by light arise on the trim panel sections 6b, 6c of the trim panels 2a, 2b.

Figure 20:
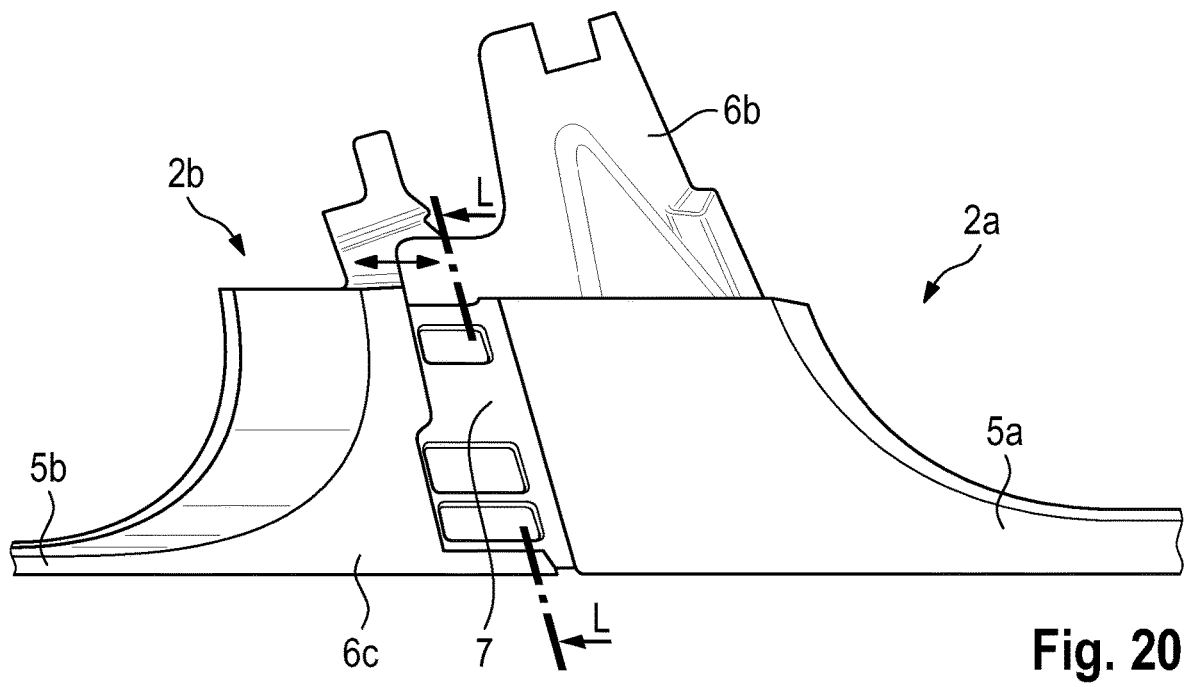
FIG. 20 shows the detail from FIG. 4 in cooperation with the detail from FIG. 8.
Figure 21:
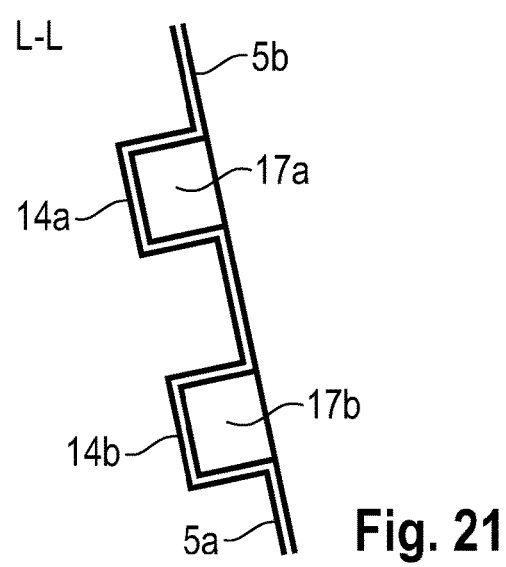
FIG. 21 shows the cross section L-L from FIG. 21.

Due to the fact that the trim panels 2a, 2b and the sections 3a, 3b which are covered by the trim panels 2a, 2b are subject to tolerances, the trim panels 2a, 2b according to FIG. 3 and FIG. 20 are designed so as to be displaceable with respect to each other in the x direction. The geometrical configuration in the form of a guide which consists of at least two tracks and in which the depressions 14a, 14b on the trim panel section 6b of the trim panel 2a and the projections 17a, 17b on the trim panel section 6c of the trim panel 2b interact without play in the region of the overlapping 7 ensures that no angular deviations from the x direction within the xz plane and no positional tolerances in the z direction occur between the trim panel 2a and the trim panel 2b. This leads to the visually advantageous result that a vertical join between the trim panels 2a, 2b is always parallel if the contact region between the trim panel section 6b of the trim panel 2a and the trim panel section 6c of the trim panel 2b opposite is designed as a joint or, as sketched in FIG. 24, in the manner of shingles.

Furthermore, it is ensured by means of the U-shaped outline of the trim panels 2a, 2b along the sections 3b, 3a that the visual compensation of the tolerances occurring in the x direction takes place at the foot of the section 4 and therefore unobtrusively in the footwell of the vehicle interior, which footwell, as mentioned above, is illuminated only a little by daylight and, in addition, is removed from the direct view of the vehicle occupant because of the ergonomic inaccessibility, particularly since a seat belt of a front seat potentially covers the join, running vertically in the z direction, between the trim panels 2a, 2b.

As a result of the abovementioned points, the invention permits a trim of the sections 3a, 3b which is join-free in the top view of the trim panels 2a, 2b, said join-free trim being revealed to the observer as soon as directly after opening of the vehicle door as interior furnishing having an impression of high quality. Furthermore, the homogeneous surfaces of the trim panels 2a, 2b, because said surfaces are not fractured by annoying joins in the top view at the entrance, visually coherently correspond to the conventionally minimally dimensioned joins along decorative elements designed especially for enhancement of the vehicle, such as, for example, entrance panels which can be embedded flush into the surfaces of the trim panels 2a, 2b opposite the door lower edge and become visible in eye-catching form upon opening of the vehicle doors.

Furthermore, the invention affords advantages during the assembly of the trim panels 2a, 2b, 8. The first trim panel 2a which is first of all fastened to the section 3a provides a form-fitting pre-positioning possibility for the second trim panel 2b by means of the depressions 14a, 14b present in the trim panel section 6b.

The second trim panel 2b is provided with generously dimensioned projections 17a, 17b on the second trim panel section 6c, said projections already ensuring during their introduction into the associated depressions 14a, 14b on the trim panel section 6b of the first trim panel 2a that the second trim panel 2b can be plugged effortlessly in the y direction onto the first trim panel 2a, which has previously been fixed to the section 3a.

Finally, the lateral flanks 13a, 13b of the pocket 10 on the trim panel section 6b of the first trim panel 2a fixed to the section 3a takeover the function of centering when, during the course of the fastening, to be undertaken in the y direction, of the third trim panel 8 to the section 4, the side flanks 24a, 24b on the projection 23 interact in a plane-parallel manner with the lateral flanks 13a, 13b of the pocket 10 on the trim panel section 6b of the first trim panel 2a. By means of this configuration, it is possible, even as the third trim panel 8 is being fixed to the section 4, for a precise join pattern with respect to the first trim panel 2a to be produced by the lateral flanks 13a, 13b, 24a, 24b coming into flat contact after the end of the assembly operation. If the third trim panel 8 has a projection 23 with a cover surface 25 which is equipped with the receptacle 26 for the connecting element 27, the centering function of the lateral flanks 13a, 13b of the pocket 10 on the trim panel section 6b of the first trim panel 2a fastened to the section 3a assists in the longitudinal axis of the connecting element 27 on the third trim panel 8 and the center point of a receiving hole 28, which is intended for the connecting element 27, in the section 4 being aligned with each other during the pre-positioning of the trim panel 8 on the section 4.

What is claimed is:

1. An interior trim of a motor vehicle for covering sections (3a, 3b, 4) of door cutouts (1a, 1b) of a motor vehicle body that face a floor (31) of the motor vehicle body, the door cutouts being bounded by a B pillar (34) that extends in a vertical direction of the motor vehicle, and by longitudinal struts (32) extending laterally next to the B pillar (34) in a longitudinal direction of the motor vehicle, the interior trim comprising first, second and third trim panels (2a, 2b, 8), wherein
   the first trim panel (2a) is configured for covering a section (3a) of the first door cutout (1a) facing the vehicle floor (31) and including a first trim panel section (5a) extending in a direction of the respective longitudinal strut (32) and a second trim panel section (6b) extending in a direction of the B pillar (34),
   the second trim panel (2b) is configured for covering a section (3b) of the second door cutout (1b) facing the vehicle floor (31) and including a first trim panel section (5b) extending in a direction of the respective longitudinal strut (32) and a second trim panel section (6c) extending in a direction of the B pillar (34) and is adjacent to the second trim panel section (6b) of the first trim panel (2a) with or without overlapping, and
   the third trim panel (8) extends in a direction of the B pillar (34) and is adjacent to the second trim panel section (6b) of the first trim panel (2a) and to the second trim panel section (6c) of the second trim panel (2b) with or without overlapping,
   groove-shaped depressions (14a, 14b) and projections (17a, 17b) are formed on a segment or edge of the second trim panel section (6b) of the first trim panel (2a) that faces the second trim panel section (6c) of the second trim panel (2b), and on a segment or edge of the second trim panel section (6c) of the second trim panel (2b) that faces the second trim panel section (6b) of the first trim panel (2a), the groove-shaped depressions (14a, 14b) and projections (17a, 17b) engaging in each other in a form-fitting manner and permitting a relative movement between the first and second trim panels (2a, 2b) in the longitudinal direction during the assembly of the interior trim to compensate for tolerances, the first, second and third trim panels (2a, 2b, 8) further are configured so that the third trim panel (8) and the first and second trim panels (2a, 2b) can be shifted relative to one another at least in the vertical direction during the assembly of the interior trim to compensate for tolerances.

2. The interior trim of claim 1, wherein
   the third trim panel (8) and one of the trim panels of the first and second trim panels (2a, 2b) are configured to be shifted relative to each other exclusively in the vertical direction,
   the third trim panel (8) and the other of the trim panels of the first and second trim panels (2a, 2b) are configured to be shifted relative to each other in the vertical direction and in the longitudinal direction.

3. The interior trim of claim 1, wherein
   at least one of the first and second trim panels (2a, 2b) is U-shaped and a third trim panel section (6a, 6d) extending in the vertical direction,
   the second trim panel section (6b, 6c) and third trim panel section (6a, 6d) of at least one of the first and second trim panels (2a, 2b) are arranged at opposite ends of the first trim panel section (5a, 5b) thereof.

4. The interior trim of claim 1, wherein the first and second trim panels (2a, 2b) can be shifted relative to each other in the longitudinal direction so that an overlapping (7) between the second trim panel sections (6b, 6c) of the first and second trim panels (2a, 2b) can be adjusted.

5. The interior trim of claim 1, wherein the third trim panel (8) and the first trim panel (2a) or the third trim panel (8) and the second trim panel (2b) can be shifted relative to each other exclusively in the vertical direction so that an overlapping (9a) between the third trim panel (8) and the second trim panel section (6b) of the first trim panel (2a) or an overlapping (9b) between the third trim panel (8) and the second trim panel section (6c) of the second trim panel (2b) can be adjusted in one direction.

6. The interior trim of claim 5, guides are formed on the second trim panel section (6b) of the first trim panel (2a) or on the second trim panel section (6c) of the second trim panel (2b), the guides being formed on a segment or edge facing the third trim panel (8) and interacting with guides (23) on the third trim panel (8) and permitting the relative movement in the vertical direction.

7. The interior trim of claim 6, wherein the guides are formed by a pocket (10) of the first trim panel (2a) and a projection (23) of the third trim panel (8) or by a pocket of the second trim panel (2b) and a projection (23) of the third trim panel (8), said guides engaging in each other in a form-fitting manner and permitting the relative movement exclusively in the vertical direction.

8. The interior trim of claim 1, wherein the third trim panel (8) and the second trim panel (2b) or the third trim panel (8) and the first trim panel (2a) can be shifted relative to one another both in the vertical direction and in the longitudinal direction so that an overlapping (9b) between the third trim panel (8) and the second trim panel section (6c) of the second trim panel (2b) or an overlapping (9a) between the third trim panel (8) and the second trim panel section (6b) of the first trim panel (2a) can be adjusted in two directions.

9. The interior trim of claim 8, wherein guides are formed on the second trim panel section (6c) of the second trim panel (2b) or on the second trim panel section (6b) of the first trim panel (2a), the guides being formed on a segment or edge facing the third trim panel (8) and interacting with guides on the third trim panel (8) and permitting the relative movements in the vertical direction and in the longitudinal direction.

10. The interior trim of claim 9, wherein the guides are formed by a projection (15) of the second trim panel (2b) and a projection (18) of the third trim panel (8) with the projections lying in a plane-parallel manner on each other and being displaceable in two directions with respect to each other, or are formed by a projection of the first trim panel (2a) and a projection (18) of the third trim panel (8) with the projections lying in a plane-parallel manner on each other and being displaceable in two directions with respect to each other.

11. An interior trim of a motor vehicle for covering sections (3a, 3b, 4) of door cutouts (1a, 1b) of a motor vehicle body that face a floor (31) of the motor vehicle body, the door cutouts being bounded by a B pillar (34) that extends in a vertical direction of the motor vehicle, and by longitudinal struts (32) extending laterally next to the B pillar (34) in a longitudinal direction of the motor vehicle, the interior trim comprising first, second and third trim panels (2a, 2b, 8), wherein
the first trim panel (2a) is configured for covering a section (3a) of the first door cutout (1a) facing the vehicle floor (31) and including a first trim panel section (5a) extending in a direction of the respective longitudinal strut (32) and a second trim panel section (6b) extending in a direction of the B pillar (34),
the second trim panel (2b) is configured for covering a section (3b) of the second door cutout (1b) facing the vehicle floor (31) and including a first trim panel section (5b) extending in a direction of the respective longitudinal strut (32) and a second trim panel section (6c) extending in a direction of the B pillar (34) and is adjacent to the second trim panel section (6b) of the first trim panel (2a) with or without overlapping, and
the third trim panel (8) extends in a direction of the B pillar (34) and is adjacent to the second trim panel section (6b) of the first trim panel (2a) and to the second trim panel section (6c) of the second trim panel (2b) with or without overlapping, wherein
guides are formed on the second trim panel section (6b) of the first trim panel (2a) or on the second trim panel section (6c) of the second trim panel (2b), the guides being formed on a segment or edge facing the third trim panel (8) and interacting with guides (23) on the third trim panel (8) and permitting the relative movement in the vertical direction so that the third trim panel (8) and the first and second trim panels (2a, 2b) can be shifted relative to one another at least in the vertical direction during the assembly of the interior trim to compensate for tolerances.

12. The interior trim of claim 11, wherein the guides are formed by a pocket (10) of the first trim panel (2a) and a projection (23) of the third trim panel (8) or by a pocket of the second trim panel (2b) and a projection (23) of the third trim panel (8), said guides engaging in each other in a form-fitting manner and permitting the relative movement exclusively in the vertical direction.

* * * * *